United States Patent
Su

(10) Patent No.: US 9,360,060 B2
(45) Date of Patent: Jun. 7, 2016

(54) RATCHET WRENCH WITH A DIRECTION SWITCHING DEVICE

(71) Applicant: BASSO INDUSTRY CORP., Taichung (TW)

(72) Inventor: San-Yih Su, Taichung (TW)

(73) Assignee: BASSO INDUSTRY CORP., Taichung (TW)

( * ) Notice: Subject to any disclaimer, the term of this patent is extended or adjusted under 35 U.S.C. 154(b) by 276 days.

(21) Appl. No.: 14/099,496

(22) Filed: Dec. 6, 2013

(65) Prior Publication Data

US 2014/0182992 A1   Jul. 3, 2014

(30) Foreign Application Priority Data

Dec. 28, 2012   (TW) .............................. 101151141 A

(51) Int. Cl.
*B25B 13/46* (2006.01)
*F16D 41/16* (2006.01)
*B25B 21/00* (2006.01)

(52) U.S. Cl.
CPC .............. *F16D 41/16* (2013.01); *B25B 21/004* (2013.01)

(58) Field of Classification Search
CPC .... B25B 13/46; B25B 13/463; B25B 21/004; F16D 41/16
See application file for complete search history.

(56) References Cited

U.S. PATENT DOCUMENTS

| 6,640,669 B2 * | 11/2003 | Izumisawa ............ B25B 21/004 81/57.39 |
| 8,757,031 B2 * | 6/2014 | Su .......................... B25B 21/004 81/57.11 |
| 9,038,504 B2 * | 5/2015 | Pusateri ................... F16H 31/00 81/57.13 |
| 2010/0326243 A1 * | 12/2010 | Bouchard ............. B25B 21/004 81/57 |

FOREIGN PATENT DOCUMENTS

| CN | 1426874 | 7/2003 |
| CN | 102470516 | 5/2012 |

* cited by examiner

*Primary Examiner* — David B Thomas
(74) *Attorney, Agent, or Firm* — Kirton McConkie; Evan R. Witt

(57) ABSTRACT

A ratchet wrench includes a direction switching device. The direction switching device includes two switching members for controlling the rotational direction of a gear, a resilient unit disposed among a body and the switching members for biasing the switching members away from the gear, and a ring unit disposed rotatably on the body. The ring unit includes a convex portion and a concave portion, and is operable to allow the convex portion and the concave portion to act on the switching members, so that one of the switching members comes into contact with the gear, while the other of the switching members is removed from the gear. When no external force is applied to the ring unit, the switching members are biased by the resilient unit to remove from the gear.

8 Claims, 7 Drawing Sheets

US 9,360,060 B2

RATCHET WRENCH WITH A DIRECTION SWITCHING DEVICE

CROSS-REFERENCE TO RELATED APPLICATION

This application claims priority of Taiwanese Application No. 101151141, filed on Dec. 28, 2012.

BACKGROUND OF THE INVENTION

1. Field of the Invention

This invention relates to a ratchet wrench, and more particularly to a ratchet wrench having a direction switching device for switching the rotational direction of a driving head.

2. Description of the Related Art

Referring to FIG. 1, a ratchet wrench 1 disclosed in Taiwanese patent No. M417233 includes a body 11, a driving wheel 13 disposed pivotally on a front end portion of the body 11 for driving rotation of a driving head 12, two push rods 14 movable toward or away from the driving wheel 13, a pawl member 15 driven by the push rods 14 to swing, and a rotatable member 16 sleeved rotatably on the body 11. The rotatable member 16 has an inner surface formed with a plurality of concave portions 161 and a plurality of convex portions 162 arranged alternately with the concave portions 161.

Upon rotation of the rotatable member 16, one of the concave portions 161 is brought into alignment with one of the push rods 14 to form a space between the one of the push rods 14 and the rotatable member 16 so as to allow the one of the push rods 14 to be biased by a spring unit (not shown) away from the pawl member 15, and one of the convex portions 162 contacts and pushes the other of the push rods 14 to mesh with the driving wheel 13, thereby limiting the driving head 12 to rotate in a corresponding direction.

However, when one of the push rods 14 moves rearwardly to contact one of the concave portions 161, the other of the push rods 14 is moved forwardly by one of the convex portions 162 to rotate the pawl member 15 to mesh with the driving wheel 13. As such, when no external force is applied to the rotatable member 16, the pawl member 15 is kept in contact with the driving wheel 13 to create a frictional resistance to smooth rotation of the driving head 12.

SUMMARY OF THE INVENTION

The object of this invention is to provide a ratchet wrench including a direction switching device that is used to control the rotational direction of a driving head such that the driving head can rotate smoothly.

According to this invention, a ratchet wrench includes a direction switching device. The direction switching device includes two switching members for controlling the rotational direction of a gear, a resilient unit disposed among a body and the switching members for biasing the switching members away from the gear, and a ring unit disposed rotatably on the body. The ring unit includes a convex portion and a concave portion, and is operable to allow the convex portion and the concave portion to act on the switching members, so that one of the switching members comes into contact with the gear, while the other of the switching members is removed from the gear. When no external force is applied to the ring unit, the switching members are biased by the resilient unit to remove from the gear.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
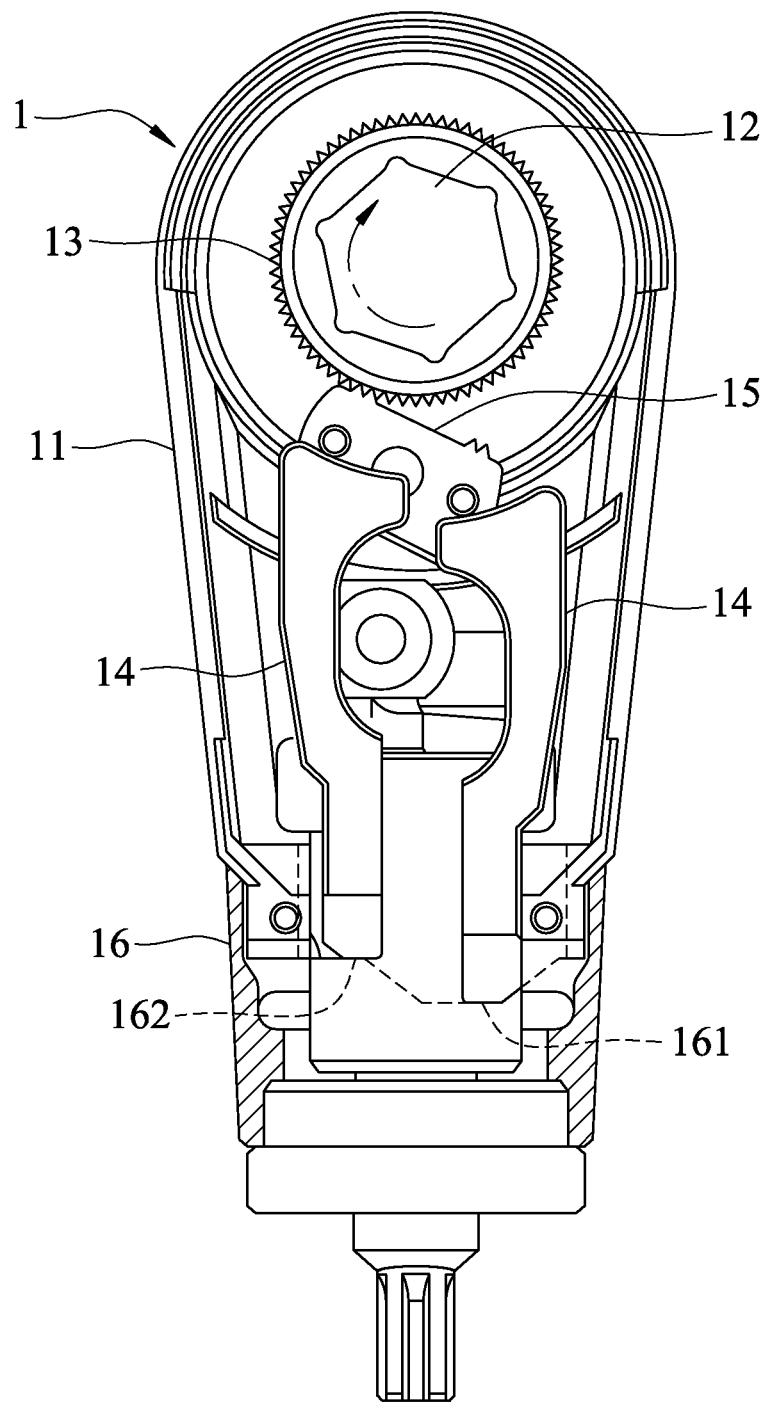
FIG. 1 is a top view of a ratchet wrench disclosed in Taiwanese patent No. M417233.
Figure 2:
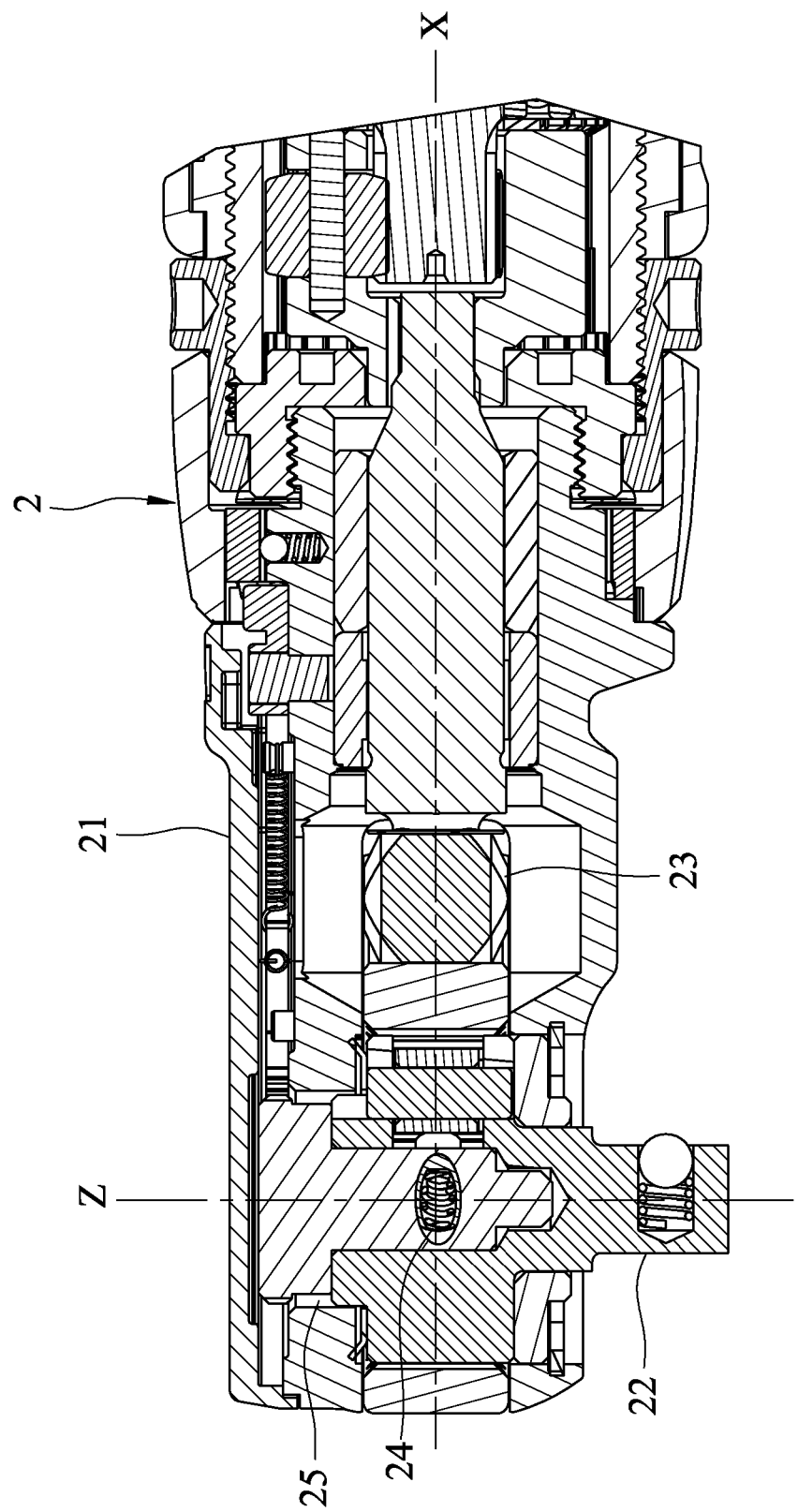
FIG. 2 is a fragmentary sectional view of the preferred embodiment of a ratchet wrench according to this invention.
Figure 3:
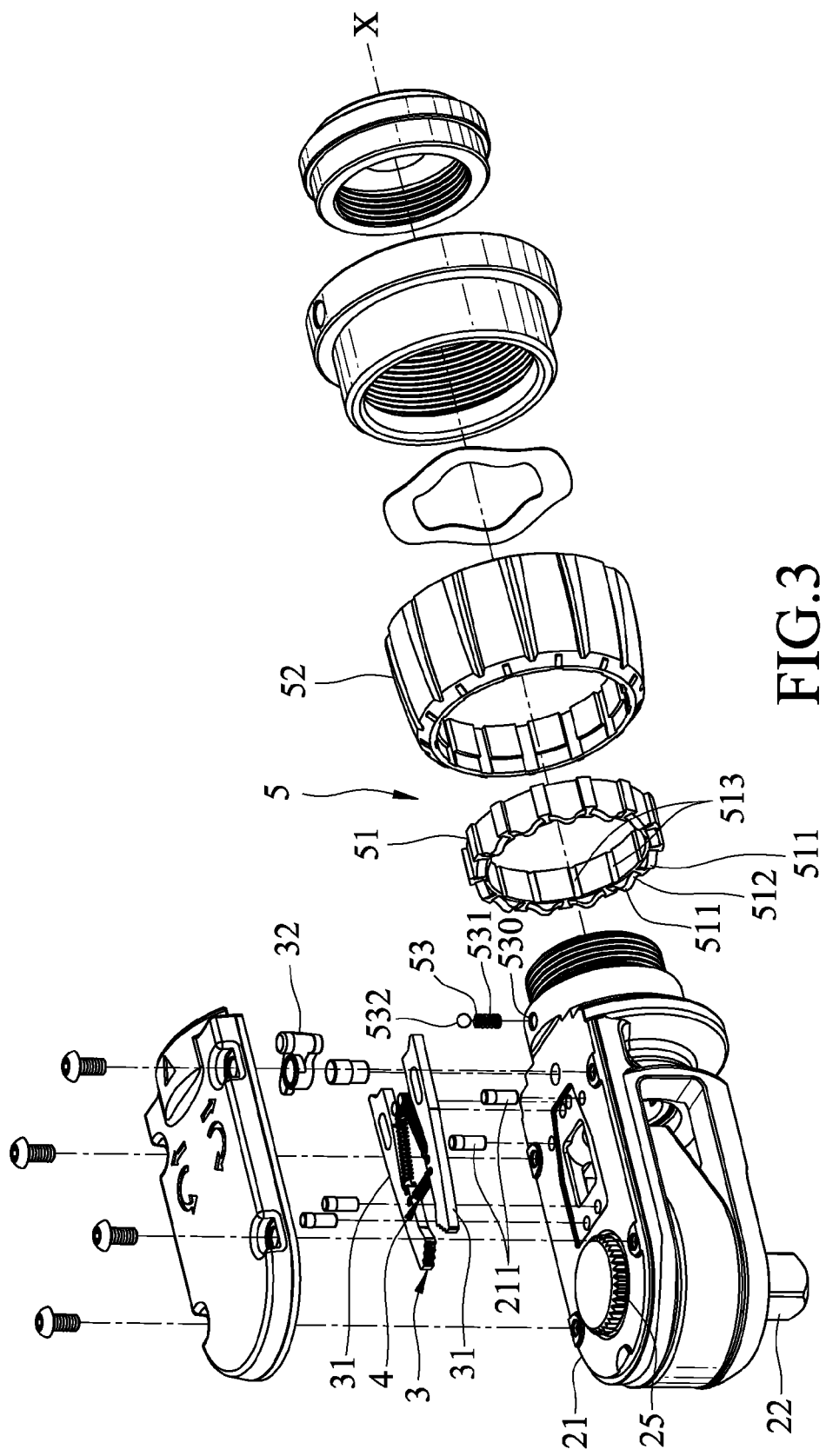
FIG. 3 is an exploded perspective view of a direction switching device of the preferred embodiment.
Figure 4:
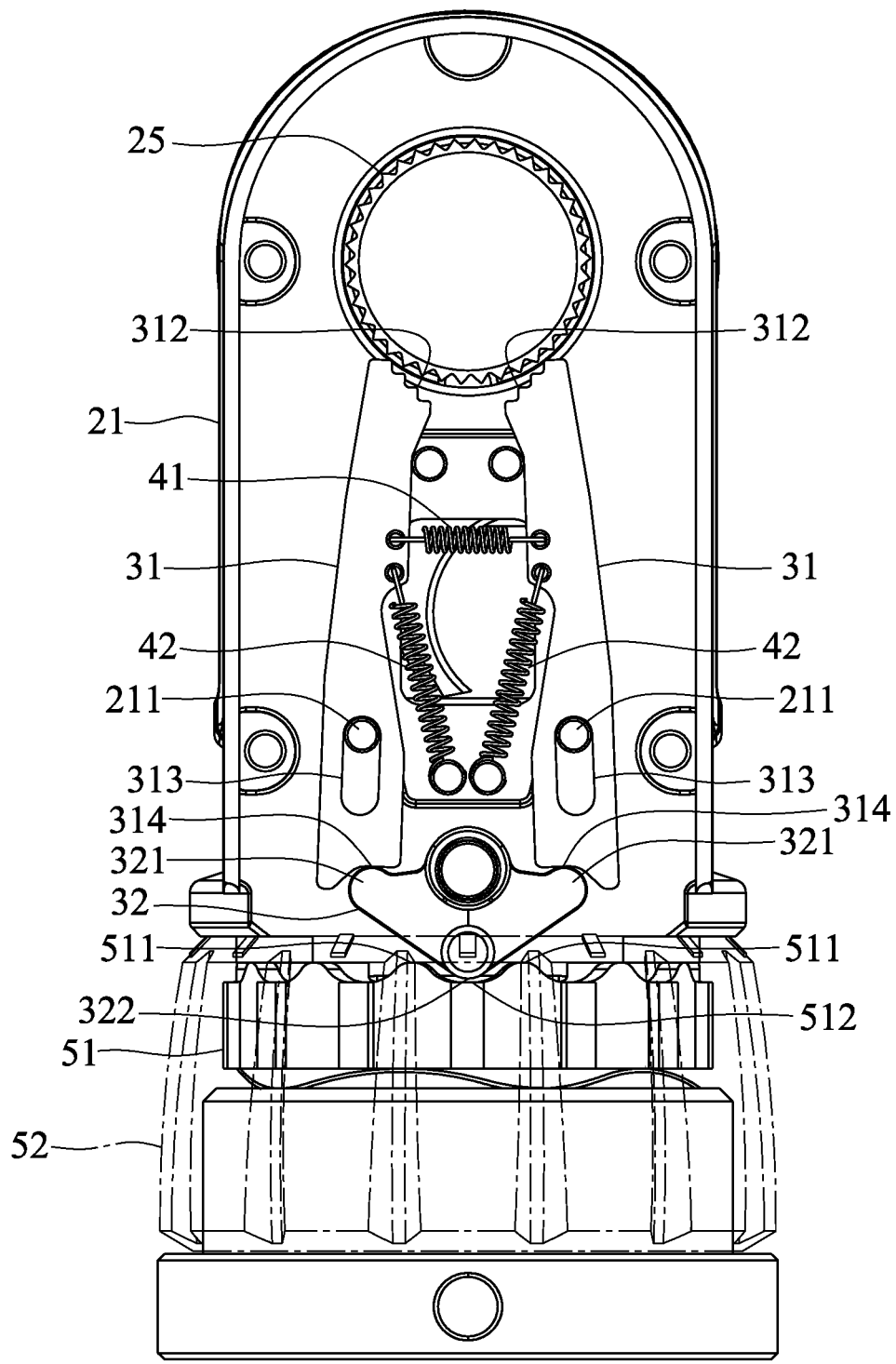
FIG. 4 is a top view of the direction switching device of the preferred embodiment when no external force is applied to an outer ring.

Referring to FIGS. 2, 3, and 4, the preferred embodiment of a ratchet wrench 2 according to this invention includes a body 21, a driving head 22 extending rotatably through a front end portion of the body 11 along a Z-axis, a drive unit 23 for driving rotation of the driving head 22, a pawl unit 24 engaging the driving head 22 and rotatable between first and second pawl positions for changing the rotational direction of the driving head 22, and a gear 25 co-rotatable with the pawl unit 24 about the Z-axis between a positive-direction position and a reverse-direction position to rotate the pawl unit 24 between the first and second pawl positions. The body 21 has two guiding portions 211 disposed at the front end portion of the body and located respectively at two sides of the X-axis. In this embodiment, each of the guiding portions 211 is configured as a pin. The direction switching device includes a switching unit 3, a resilient unit 4, and a ring unit 5.

The switching unit 3 includes two switching members 31 and a rotary valve 32. The switching members 31 are adjacent to each other, and are located respectively at two sides of the X-axis. Each of the switching members 31 is configured as a rack, and has a meshing end 312 engageable with the gear 25, an engaging portion 313 engaging a respective one of the guiding portions 211 so as to guide movement of the switching member 31 toward and away from the gear 25, and a driven end 314 contactable with the ring unit 5. In this embodiment, each of the engaging portions 313 is configured as a slot. The rotary valve 32 is disposed pivotally on the body 21, is disposed between the ring unit 5 and the switching members 31, and includes two driving portions 321 disposed respectively at two opposite lateral ends of the rotary valve 32 and contactable respectively with the driven ends 314 of the switching members 31, and a follower surface 322 disposed at a rear end of the rotary valve 32 and facing the ring unit 5.

The resilient unit 4 includes a first resilient member 41 connected between the switching members 31 and disposed between the gear 25 and the guiding portions 211, and two second resilient members 42 each connected between the body 21 and a respective one of the switching members 31 for biasing the respective one of the switching members 31 away from the gear 25.

The ring unit 5 includes an inner ring 51 surrounding the X-axis and disposed rotatably on the body 21, an outer ring 52 sleeved on the inner ring 51 and exposed from the body 21 so as to allow for manual operation, and a positioning mechanism 53. The inner ring 52 includes a wavy end surface proximate to the switching members 31 and having a plurality of convex portions 511 and a plurality of concave portions 512 such that the convex portions 511 are arranged alternately with the concave portions 512, and an inner surface formed with a plurality of angularly equidistant positioning grooves 513. In this embodiment, the convex portions 511 and the concave portions 512 are curved. The outer ring 52 has a splined inner surface engaging a splined outer surface of the inner ring 51 so as to co-rotate with the inner ring 51. The positioning mechanism 53 includes a cavity 530 formed in an outer surface of the body 21, a spring 531, and a ball 532. The spring 531 and the ball 532 are disposed within the cavity 530. The spring 531 biases the ball 532 to project from the cavity 530 to engage a selected one of the positioning grooves 513, so as to position the inner and outer rings 51, 52 relative to the body 21.

Figure 5:
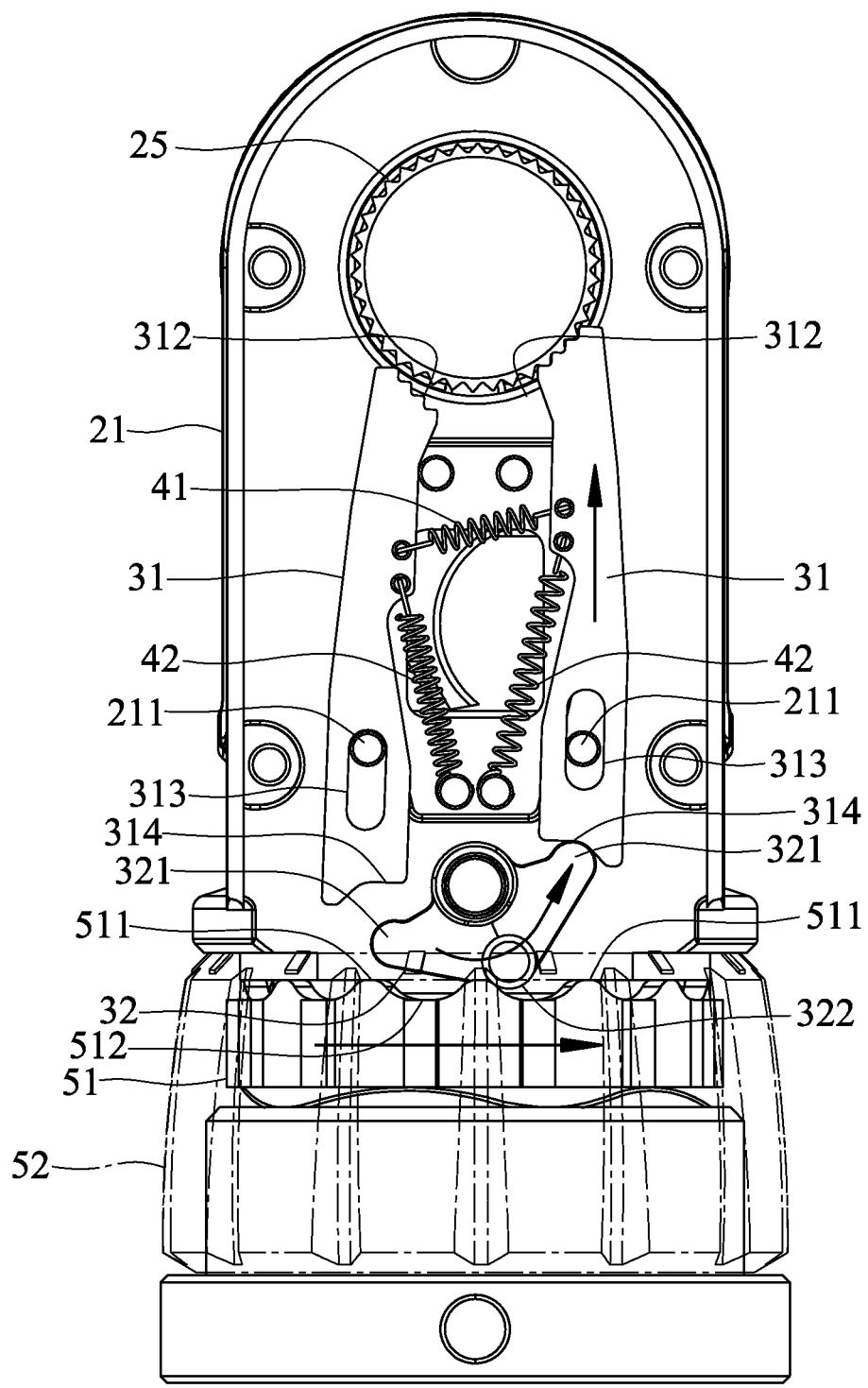
FIG. 5 is a view similar to FIG. 4 but illustrating that an external force is applied to the outer ring to thereby move a switching member to contact a gear.
Figure 6:
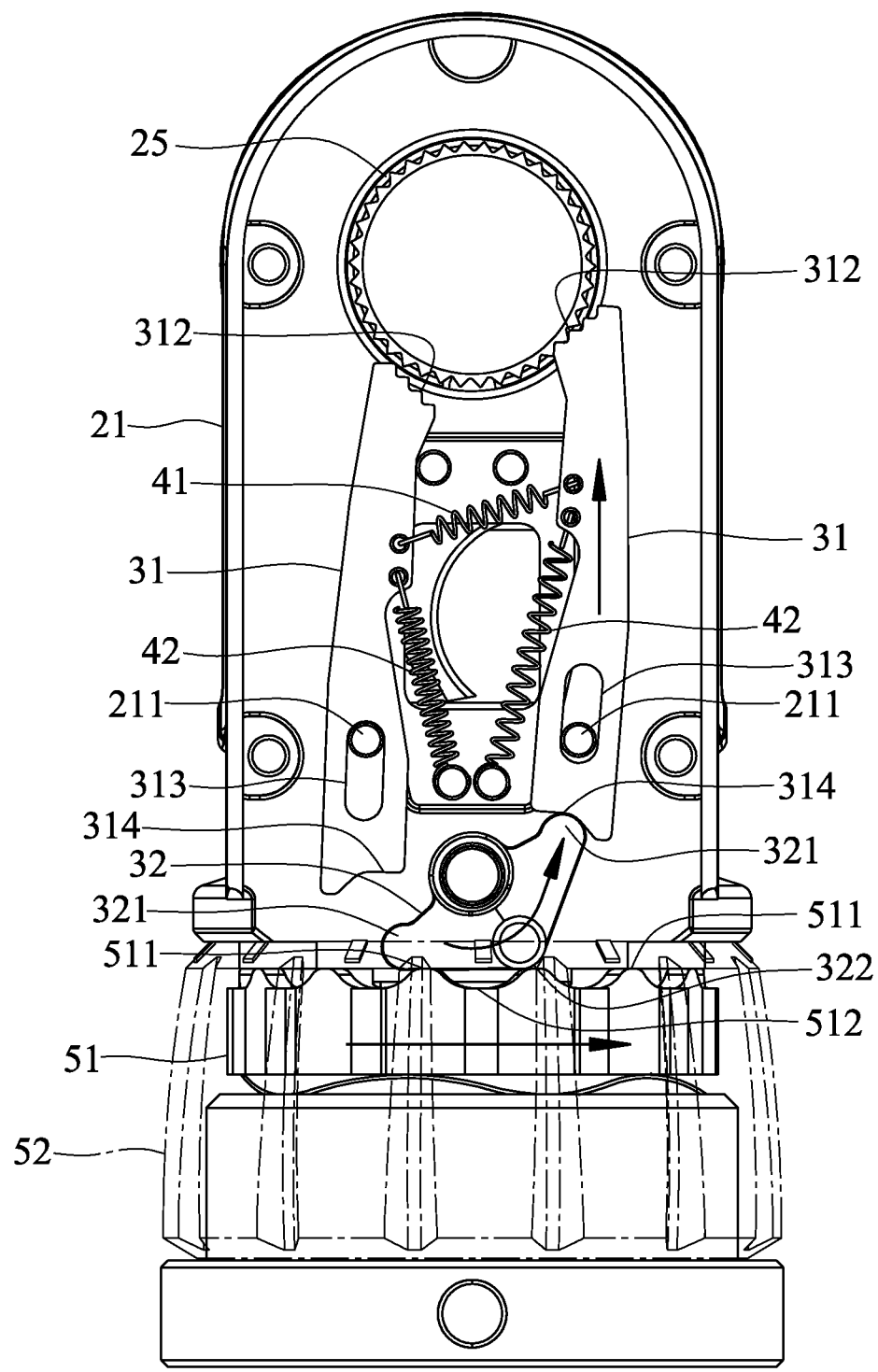
FIG. 6 is a view similar to FIG. 4 but illustrating that the gear is rotated by the switching member.
Figure 7:
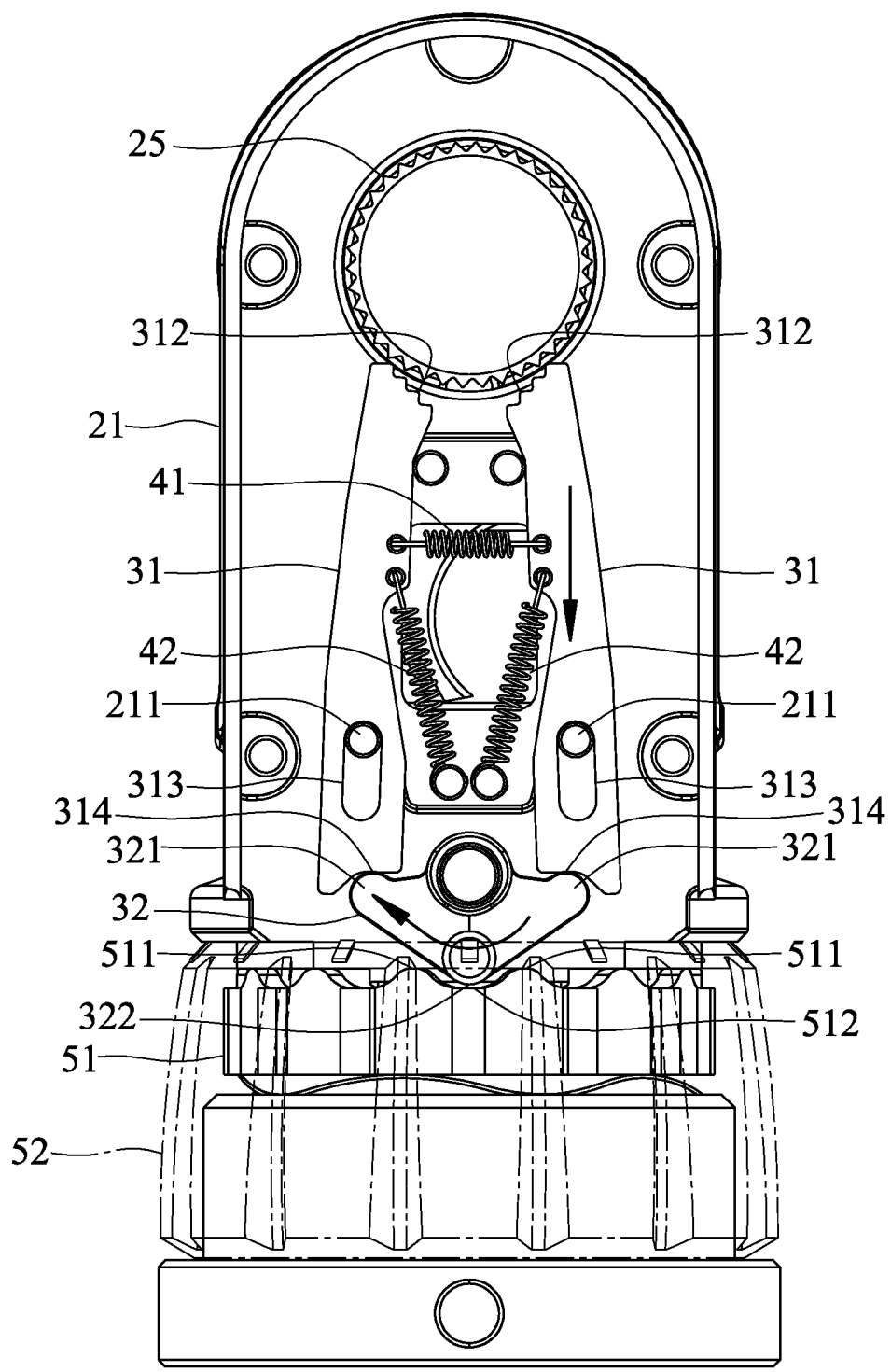
FIG. 7 is a view similar to FIG. 4 but illustrating that the switching member is biased by a resilient unit to return to its original position.

Each of the switching members 31 is convertible between a first state shown in FIG. 4, where the corresponding switching member 31 is not in contact with the gear 25, and a second state shown in FIGS. 5 and 6, where the corresponding switching member 31 is in contact with the gear 25.

With particular reference to FIG. 4, due to the biasing action of the resilient unit 4 disposed among the body 21 and the switching members 31, when no external force is applied to the switching members 31, the switching members 31 are removed from the gear 25 to contact the driving portions 321 of the rotary valve 32, so that the follower surface 322 of the rotary valve 32 is aligned with one of the concave portions 512 of the inner ring 51, such that the follower surface 322 is disposed within a groove defined by the one concave portion 512. As such, when each of the switching members 31 is in the first state, it is not in contact with the gear 25. In this state, the guiding portions 211 are disposed in front ends of the engaging portions 313, so that each of the switching members 31 is disposed at a rear limit position.

With particular reference to FIGS. 5 and 6, when an external force is applied to rotate the ring unit 5, one of the convex portions 511 comes into contact with and passes past the follower surface 322 of the rotary valve 32 to rotate the rotary valve 32 counterclockwise so that, one of the driving portions 321 pushes and moves one of the switching members 31 forwardly to contact and rotate the gear 25 against the biasing action of the first resilient member 41 and the corresponding second resilient member 42 to convert the one switching member 31 into the second state, while the other of the driving portions 321 is removed from the other of the switching members 31. During forward movement of the one switching member 31, due to engagement between the corresponding engaging portion 313 and the corresponding guiding portion 211, the one switching member 31 is guided to move toward the gear 25. At the same time, the pawl unit 24 co-rotates with the gear 25.

When the one switching member 31 reaches a front limit position shown in FIG. 6, the gear 25 is rotated to the positive-direction position, and thus the pawl unit 24 is rotated to the first pawl position so that the driving head 22 is limited by the pawl unit 24 to rotate in a positive direction.

Subsequently, with particular reference to FIG. 6, when the external force is released, the resilient unit 4 biases the switching members 31 to return to the rear limit positions to thereby rotate the rotary valve 32 clockwise, so as to align the follower surface 322 with the next concave portion 512. In this manner, by acting of one of the convex portions 511 and one of the concave portions 512 on the switching unit 3, a direction switching operation is completed. When a subsequent direction switching operation is performed, the gear 25 is rotated to the reverse-direction position, and the pawl unit 24 is rotated to the second pawl position, so as to limit the driving head 22 to rotate in a reverse direction.

In view of the above, through a change in the positions of the ring unit 5 and the switching members 31 as well as the biasing action of the resilient unit 4, one of the switching members 31 can contact the gear 25 only when the rotational direction of the driving head 22 is switched. As soon as a direction switching operation is completed, the one switching member 31 no longer contacts the gear 25. Consequently, a frictional resistance to rotation of the driving head 22 can be reduced, thereby facilitating smooth operation of the ratchet wrench. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. A ratchet wrench comprising:
   a body;
   a driving head extending rotatably through said body;
   a pawl unit contactable with said driving head for changing a rotational direction of the driving head;
   a gear co-rotatable with said pawl unit relative to said body about a Z-axis between a positive-direction position and a reverse-direction position; and
   a direction switching device including:
      a switching unit including two switching members adjacent to each other and each convertible between a first state and a second state, each of said switching members being not in contact with said gear when in said first state, and meshing with and rotating said gear when in said second state, such that said gear is rotated in a direction by one of said switching members, and in an opposite direction by the other of said switching members,
      a resilient unit disposed among said body and said switching members for biasing said switching members away from said gear such that, when no external force is applied to said switching members, said switching members are spaced apart from said gear, and
      a ring unit surrounding an X-axis perpendicular to the Z-axis, said ring unit including at least one convex portion and at least one concave portion, said ring unit being rotatable relative to said body so as to allow said convex portion and said concave portion to act on said switching unit, thereby converting one of said switching members from said first state into said second state against biasing action of said resilient member, and allowing the other of said switching members to be biased to said first state by said resilient unit;
   wherein each of said switching members is configured as a rack, and has a meshing end engageable with said gear, and a driven end contactable with said ring unit; and
   wherein said switching unit further includes a rotary valve disposed pivotally on said body and disposed between said ring unit and said switching members, said rotary valve including a follower surface facing said ring unit, and two driving portions that are disposed respectively at two composite lateral ends of said rotary valve and that are contactable respectively with said driven ends of said switching members when no external force is applied to said ring unit.

2. The ratchet wrench as claimed in claim wherein said ring unit includes a plurality of said convex portions and a plurality of said concave portions, said convex portions and said concave portions being curved, said convex portions being arranged alternately with said concave portions.

3. The ratchet wrench as claimed in claim 1, wherein said body has two guiding portions, and each of said switching members has an engaging portion engaging a respective one of said guiding portions so as to guide movement of a corresponding one of said switching members toward and away from said gear.

4. The ratchet wrench as claimed in claim 1, wherein each of said guiding portions is configured as a pin, and each of said engaging portions is configured as a slot.

5. The ratchet wrench as claimed in claim 1, wherein said resilient unit includes a first resilient member that is connected between said switching members and that is between said gear and said guiding portions.

6. The ratchet wrench as claimed in claim 1, wherein said resilient unit further includes two second resilient members each connected between said body and a respective one of said switching members for biasing said respective one of said switching members away from said gear.

7. The ratchet wrench as claimed in claim 1, wherein said ring unit includes an inner ring having said convex portion and said concave portion that are disposed at an end of said inner ring, and an outer ring sleeved on and co-rotatable with said inner ring and exposed from said body so as to allow for manual operation.

8. The ratchet wrench as claimed in claim 7, wherein said ring unit further includes a positioning mechanism, and said inner ring has an inner surface formed with a plurality of angularly equidistant positioning grooves, said positioning mechanism including a cavity formed in an outer surface of said body, a ball disposed within said cavity, and a spring disposed within said cavity for biasing said ball to project from said cavity to engage a selected one of said positioning grooves, so as to position said inner and outer rings relative to said body.

* * * * *